United States Patent
Torres et al.

(10) Patent No.: US 10,305,587 B2
(45) Date of Patent: May 28, 2019

(54) METHOD AND APPARATUS FOR CONDITION BASED MAINTENANCE OF FIBER NETWORKS ON VEHICLES

(71) Applicant: Sikorsky Aircraft Corporation, Stratford, CT (US)

(72) Inventors: Myra Torres, Pittsford, NY (US); Michael J. Moore, Rochester, NY (US); Jeremy W. Sheaffer, Pittsford, NY (US); Brian Drost, Fairport, NY (US); Maksim Bobrov, Rochester, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 6 days.

(21) Appl. No.: 15/310,036

(22) PCT Filed: Mar. 6, 2015

(86) PCT No.: PCT/US2015/019188
§ 371 (c)(1),
(2) Date: Nov. 9, 2016

(87) PCT Pub. No.: WO2015/183364
PCT Pub. Date: Dec. 3, 2015

(65) Prior Publication Data
US 2017/0264362 A1    Sep. 14, 2017

Related U.S. Application Data

(60) Provisional application No. 61/990,768, filed on May 9, 2014.

(51) Int. Cl.
*H04B 10/071*    (2013.01)
*H04B 10/077*    (2013.01)
(Continued)

(52) U.S. Cl.
CPC ....... *H04B 10/0771* (2013.01); *H04B 10/071* (2013.01); *H04B 10/07953* (2013.01); *H04B 10/2504* (2013.01)

(58) Field of Classification Search
CPC .................. H04B 10/00; H04B 10/077; H04B 10/07955; H04B 10/0771; H04B 10/071;
(Continued)

(56) References Cited

U.S. PATENT DOCUMENTS

| 5,446,725 A | 8/1995 | Ishiwatari |
| 5,767,956 A | 6/1998 | Yoshida |

(Continued)

FOREIGN PATENT DOCUMENTS

| EP | 1881623 A2 | 1/2008 |
| EP | 1918747 A1 | 5/2008 |

(Continued)

OTHER PUBLICATIONS

International Search Report and Written Opinion of the International Searching Authority for application PCT/US2015/019188 dated Jan. 12, 2016; 6 pages.

(Continued)

*Primary Examiner* — Ted M Wang
(74) *Attorney, Agent, or Firm* — Cantor Colburn LLP

(57) ABSTRACT

A system and method of condition based maintenance of a fiber network includes a processor and memory having instructions that when executed cause the system to transmit an optical signal over a plurality of fiber links in the fiber network; receive a response signal in response to the transmitting of the optical signal; and determine one or more condition indicators in response to the receiving of the response signal.

20 Claims, 8 Drawing Sheets

(51) Int. Cl.
*H04B 10/079* (2013.01)
*H04B 10/25* (2013.01)

(58) Field of Classification Search
CPC .......... H04B 10/07953; H04B 10/2504; H04J 14/0221; H04J 14/0227
See application file for complete search history.

(56) References Cited

U.S. PATENT DOCUMENTS

| | | | |
|---|---|---|---|
| 5,926,263 | A | 7/1999 | Lynch et al. |
| 7,095,493 | B2 | 8/2006 | Harres |
| 7,167,443 | B1 * | 1/2007 | Dantu ................. H04L 12/437 370/218 |
| 7,341,384 | B2 | 3/2008 | Chan et al. |
| 8,306,421 | B1 | 11/2012 | Mazuk et al. |
| 8,417,113 | B1 | 4/2013 | Harres |
| 2004/0165888 | A1 | 8/2004 | Gerstel et al. |
| 2009/0257743 | A1 | 10/2009 | Chung et al. |
| 2010/0296808 | A1 | 11/2010 | Hinderthur |
| 2011/0236021 | A1 | 9/2011 | Presi et al. |
| 2012/0224846 | A1 | 9/2012 | Swanson et al. |
| 2013/0089204 | A1 | 4/2013 | Kumar et al. |
| 2013/0286852 | A1 | 10/2013 | Bowler et al. |

FOREIGN PATENT DOCUMENTS

| | | | |
|---|---|---|---|
| EP | 1945510 | A1 | 7/2008 |
| EP | 2136377 | A1 | 12/2009 |
| EP | 2323005 | A1 | 5/2011 |
| WO | 2013134404 | A1 | 9/2013 |

OTHER PUBLICATIONS

Andrew S. Glista, Jr. et al., "Wavelength Division Multiplexed (WDM) Optical Technology Solutions for Next Generation Aerospace Networks", The 22nd Digital Avionics Systems Conference Proceedings, Indianapolis, IN., Oct. 12-16, 2003, 13 pages.
Beranek, M. W.; Avak, A.R; "Improving Avionics Fiber Optic Network Reliability and Maintainability Via Built-In-Test" IEEE/AIAA 25th Digital Avionics Systems Conference, 2006.
Clark, G.J, Vian, J et all.;"Multi-platform Airplane Health Management" IEEEAC paper #1575, Version 6.2, Updated Dec. 20, 2006.
Extended European Search Report for Application No. 15799044. 1-1874/3140637, dated Nov. 6, 2017 (11 pp.).
IPRP; International Application No. PCT/US2015/019188; International Filing Date: Mar. 6, 2015; dated Nov. 15, 2016; pp. 1-7.
Jiang Zhang et al., "Developing a Generic Optical Avionic Network", 18th International Conference on Telecommunications, 2011, 6 pages.
Shannon, R.; Richardson, T;"Lessons Learned in Implementing a Net-Centric Diagnostic Solution for the F/A-18 Maintenance Environment" IEEE Autotestcon 2009. * NAVAIR Public Release 09-0045.
Communication Purguarat to Articie 94(3) EPC; European Application No. 15799044.1; dated Sep. 14, 2018; dated Oct. 2, 2018; 7 Pages.

* cited by examiner

US 10,305,587 B2

METHOD AND APPARATUS FOR CONDITION BASED MAINTENANCE OF FIBER NETWORKS ON VEHICLES

CROSS REFERENCE TO RELATED APPLICATIONS

This application is a National Phase Application of Patent Application PCT/US2015/019188 filed on Mar. 6, 2015, which claims benefit of U.S. Provisional Application No. 61/990,768 filed May 9, 2014, the contents of which are incorporated herein by reference in their entirety.

STATEMENT REGARDING FEDERALLY SPONSORED RESEARCH OR DEVELOPMENT

This invention was made with Government support with the United States Navy under Contract No. N68335-11-C-0192. The Government therefore has certain rights in this invention.

BACKGROUND

The subject matter disclosed herein relates generally to the field of diagnosis and prognosis of networks and, more particularly, to a monitoring system for autonomously diagnosing and prognosticating adverse events or failures in a fiber network on machinery on aircraft.

DESCRIPTION OF RELATED ART

In comparison with copper networks, fiber optic networks in aircraft provide the benefits of smaller size, weight and power requirements, increased bandwidth, lower latency, and a smaller electromagnetic footprint; however, fault detection and mitigation in aircraft-deployed fiber networks are troublesome because a fault can be prevalent in-flight but not manifest on the ground. Condition-based Maintenance (CBM) has been used as the model for fault detection on fiber networks in these machines. CBM comprises a set of maintenance actions based on real-time or near real-time assessments of the condition of, e.g., avionics systems, that can be obtained from embedded sensors, and external tests and measurements, based on current condition indicators. But monitoring of fiber networks poses a challenge in bandwidth and computational resources for systems in aircraft and relies on the main computational resources of the aircraft.

The monitoring of high-speed fiber networks may require significant sensor data volume and still not produce realistic fault coverage. Built-in Test (BIT) condition indicators (CIs) are incorporated into network equipment and transceivers for failure detection, but these typically do little to address the health of the entire network and subsystems. A method and architecture for autonomous CBM of fiber networks on aircraft and other machinery that addresses bandwidth and computational resources is desired.

BRIEF SUMMARY

According to one aspect of the invention, a system for condition based maintenance of a fiber network includes a processor; and memory having instructions stored thereon that, when executed by the processor, cause the system to: transmit an optical signal over a plurality of fiber links in the fiber network; receive a response signal in response to the transmitting of the optical signal; and determine one or more condition indicators in response to the receiving of the response signal.

In addition to one or more of the features described above, or as an alternative, further embodiments could include transmitting a pseudo-random bit sequence (PRBS) in the optical signal via an optical time domain reflectometer (OTDR).

In addition to one or more of the features described above, or as an alternative, further embodiments could include transmitting parity bits in the PRBS.

In addition to one or more of the features described above, or as an alternative, further embodiments could include determining a bit error ratio in the response signal.

In addition to one or more of the features described above, or as an alternative, further embodiments could include determining a faulty fiber link of the plurality of fiber links in response to the determining of the bit error ratio.

In addition to one or more of the features described above, or as an alternative, further embodiments could include routing the optical signal away from the faulty fiber link in response to the determining of the bit error ratio.

In addition to one or more of the features described above, or as an alternative, further embodiments could include a response signal that comprises a reflected signal indicative of a discontinuity in the fiber network.

In addition to one or more of the features described above, or as an alternative, further embodiments could include comparing the response signal with a stored fault pattern in response to the receiving of the response signal.

In addition to one or more of the features described above, or as an alternative, further embodiments could include transmitting the one or more condition indicators to a reasoner engine for prioritizing and ranking the one or more condition indicators.

In addition to one or more of the features described above, or as an alternative, further embodiments could include a condition indicator that is indicative of a faulty link in transmission over the fiber network.

According to another aspect of the invention, a method of condition based maintenance of a fiber network includes transmitting, with a processor, an optical signal over a plurality of fiber links in the fiber network; receiving, with the processor, a response signal in response to the transmitting of the optical signal; and determining, with the processor, one or more condition indicators in response to the receiving of the response signal.

In addition to one or more of the features described above, or as an alternative, further embodiments could include transmitting a pseudo-random bit sequence (PRBS) in the optical signal.

In addition to one or more of the features described above, or as an alternative, further embodiments could include transmitting parity bits in the PRBS.

In addition to one or more of the features described above, or as an alternative, further embodiments could include determining a bit error ratio in the response signal.

In addition to one or more of the features described above, or as an alternative, further embodiments could include determining a faulty fiber link of the plurality of fiber links in response to the determining of the bit error ratio.

In addition to one or more of the features described above, or as an alternative, further embodiments could include routing the optical signal away from the faulty fiber link in response to the determining of the bit error ratio.

In addition to one or more of the features described above, or as an alternative, further embodiments could include a response signal that comprises a reflected signal indicative of a discontinuity in the fiber network.

In addition to one or more of the features described above, or as an alternative, further embodiments could include a response signal that is indicative of a link loss in transmission over the fiber network.

In addition to one or more of the features described above, or as an alternative, further embodiments could include comparing the response signal with a stored fault pattern in response to the receiving of the response signal.

In addition to one or more of the features described above, or as an alternative, further embodiments could include transmitting the one or more condition indicators to a reasoner engine for prioritizing and ranking the condition indicator.

Other aspects, features and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
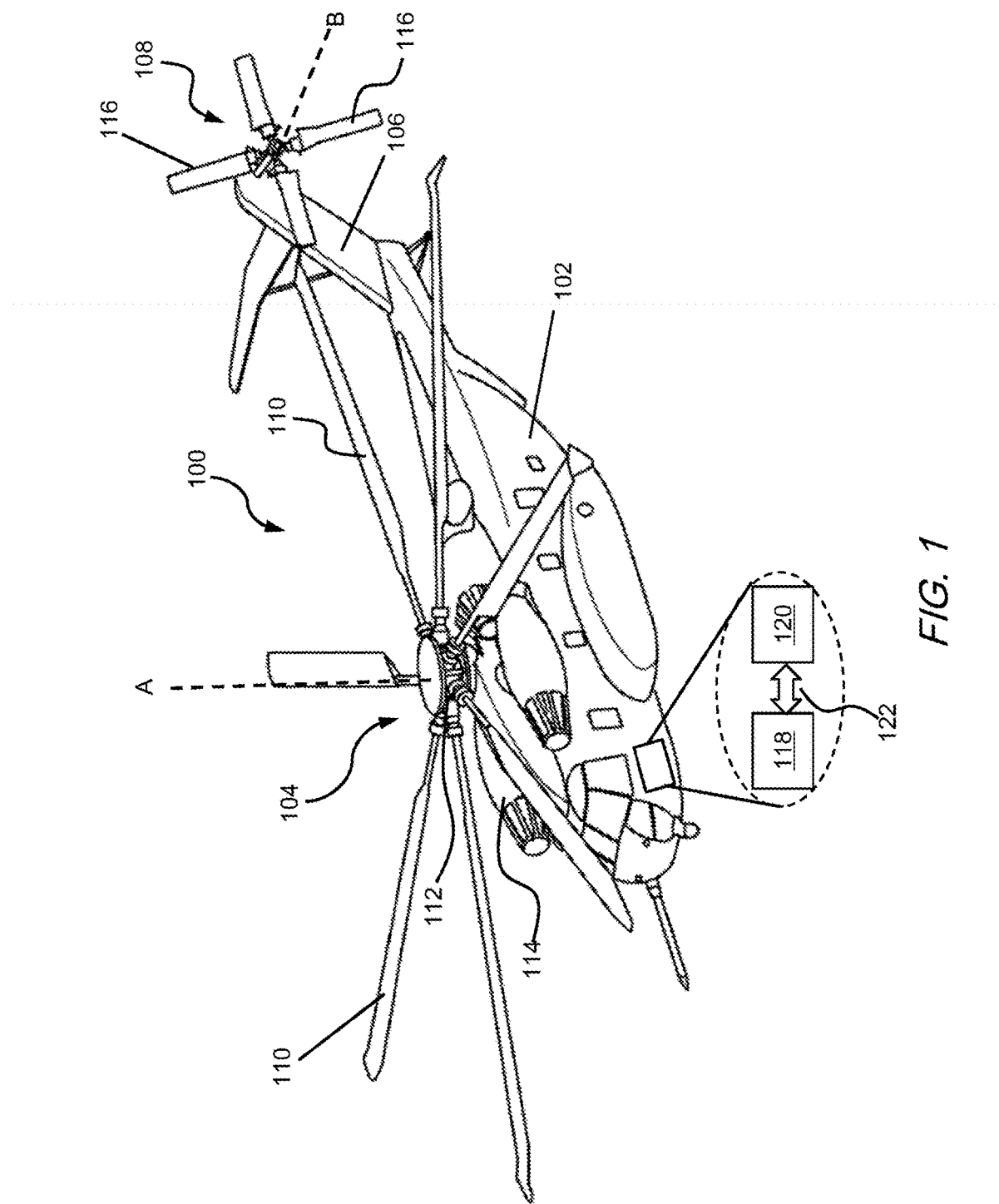
FIG. 1 is a perspective view of an exemplary aircraft for use with embodiments of the invention.

Referring now to the drawings, FIG. 1 illustrates a general perspective view of an exemplary vehicle in the form of a rotorcraft or helicopter 100 that uses an integrated fault monitoring system 120 for autonomous CBM of a fiber network based on a quality of fiber link according to an embodiment of the invention. Helicopter 100 includes an aircraft computer 118 in data communication with a fault monitoring system 120 through a communication link 122. In embodiments communication link 122 may be hard-wired or be wireless. In embodiments, additional fault monitoring systems substantially similar to fault monitoring system 120 may be provided which also communicate fault information to aircraft computer 118 in order to provide CBM information from subsystems on helicopter 100.

In an embodiment, aircraft computer 118 includes a vehicle reasoner engine 209 (FIG. 2) that includes a system fault model to prioritize and rank fault data that is received from one or more fault monitoring systems 120, onboard helicopter 100, as will be described below in reference to FIG. 2. Although a particular configuration for helicopter 100 is illustrated and described in the disclosed embodiments, other vehicles such as, for example, fixed wing aircraft, ground vehicles and sea-based vehicles, in addition to fixed, non-vehicular installations, will also benefit from embodiments of the invention. While the invention is being discussed with reference to rotary-wing aircraft, where the size, weight, and power advantages of fiber over other technologies are exemplary, the concepts and ideas expressed herein can also benefit and be equally applicable to sea- and ground-based vehicles and to fixed installations. As such, embodiments of the disclosed invention are not restricted to application in aircraft, but are applicable wherever reliable fiber networks are desired.

Figure 2:
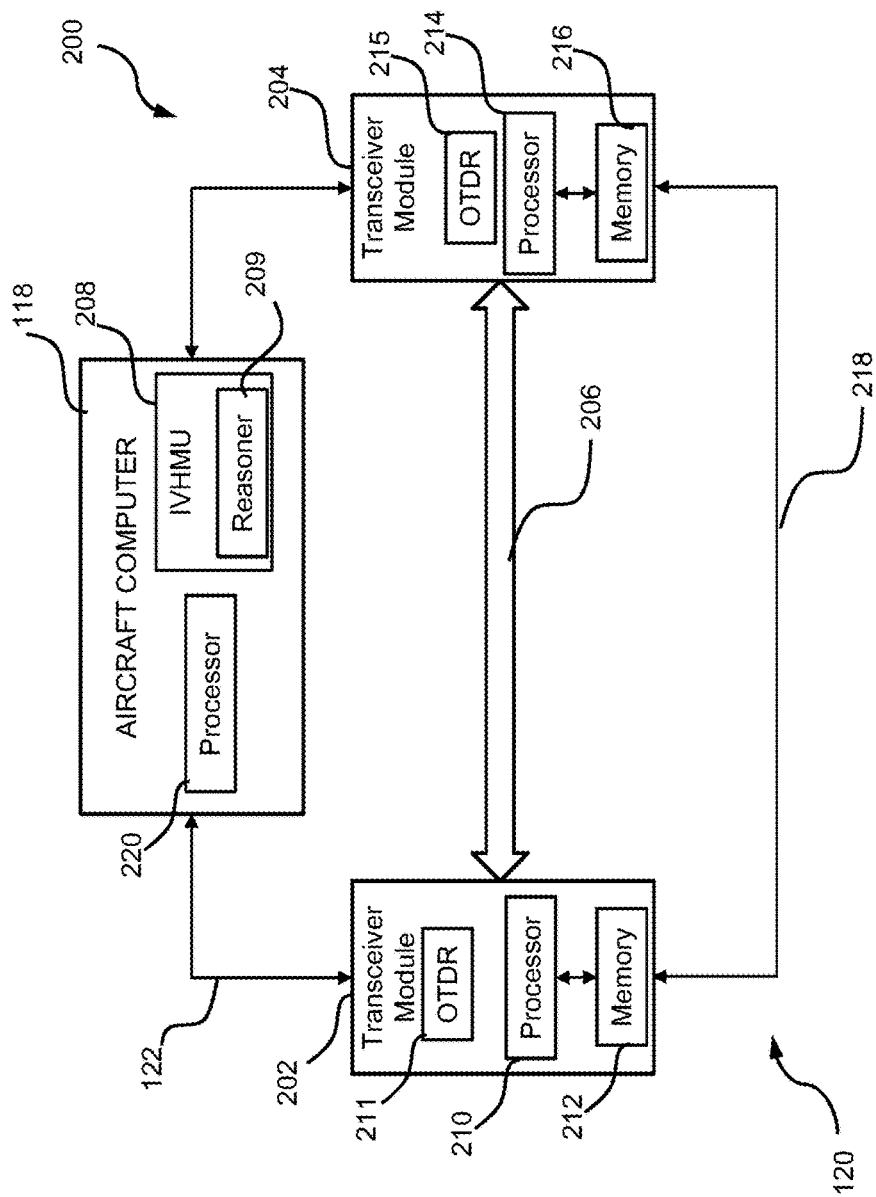
FIG. 2 is a block diagram illustrating an exemplary architecture according to an embodiment of the invention.

FIG. 2 illustrates architecture 200 for an autonomous CBM of a fiber network of aircraft 100 (FIG. 1) according to an embodiment of the invention. Architecture 200 includes a fault monitoring system 120, comprising a processor module 202 that is in data communication with processor module 204 over fiber network 206. The processing modules 202 and 204 may comprise single-processor or multi-processor systems of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. As shown, processor module 202 is in data communication with processor module 204 over data bus 218; but, in an embodiment, processor module 202 may communicate wirelessly with processor module 204. In embodiments, fault monitoring system 120 may communicate equipment status or condition indicators to an integrated vehicle health management unit (IVHMU) 208 in order to rank probability of faults that are received by processor modules 202 and 204. The IVHMU 208 includes a vehicle reasoner engine 209 that can make inferences about the operation of the subsystems based on models including ranking the probability of faults that are passed on from processor modules 202 and 204. Vehicle reasoner engine 209 stores a count of faults detected by fault monitoring system 120 and prioritizes the faults for further action by maintenance crews. Vehicle reasoner engine 209 can compare the received data to a table to determine the quality of a fiber link and whether it exceeds an allowable threshold, ranks the condition indicators in terms of severity and provides information for maintenance actions. As such, the IVHMU 208 increases forecasting confidence of faults in aircraft 100 (FIG. 1) by drawing on knowledge from other subsystems that are connected through architecture 200. The fault monitoring system 120 can perform autonomous testing of the degradation of fiber network 206 through processor modules 202 and 204 without using bandwidth and computational resources of IVHMU 208 or processors 220, on aircraft computer 118, as is traditionally done in conventional architectures. The fiber network 206 may be coupled to subsystems such as avionics systems, weapons systems or the like and can include connectors at each end of processor modules 202 and 204, and lines and splices along the transmission path between processor modules 202 and 204; these are not shown for ease of understanding of architecture 200.

Also shown in FIG. 2, processor modules 202 and 204 can include BIT-capable, integrated, optical time domain reflectometer (OTDR) transceivers 211 and 215 for interrogating fiber network 206 with signals in order to determine discontinuities (such as breaks) or link loss and bit error rates in transmission between processor module 202 and processor module 204. Processor modules 202 and 204 include algorithms for implementing autonomous CBM of fiber network 206 independently of the IVHMU 208. Processor modules 202 and 204 include integrated OTDR transceivers 211 and 215 for transmitting optical signals to fiber network 206 for interrogating the fiber network 206. Processor modules 202 and 204 include memory 212 and 216, which each store one or more fault detection algorithms as executable instructions that are executed by processors 210 and 214. Also, memories 212 and 216 store fault patterns that can be matched to resulting scatter patterns received over fiber network in order to correlate with condition indicators. In embodiments, the instructions may be stored or organized in any manner and at any level of abstraction, such as in connection with the execution of the fault detection algorithms. The processors 210 and 214 may be any type of processor or processors, including general purpose processors (CPUs), digital signal processors (DSPs), microcontrollers, application specific integrated circuits (ASICs), field programmable gate arrays (FPGAs) or the like. Also, in embodiments, memories 212 and 216 may include random access memory (RAM), read only memory (ROM), or other electronic, optical, magnetic or any other computer readable medium onto which is stored the fault detection algorithms. Processors 210 and 214 need not be identical, nor is the system limited to only two processing modules 202 and 204.

Processor module 204 is substantially similar to processor module 202 and includes an integrated optical time domain reflectometer (OTDR) transceiver 215 for transmitting optical signals over fiber network 206 for detecting faults and link loss in fiber network 206. In embodiments, processor module 202 can include algorithms for implementing autonomous CBM of fiber network 206 in addition to algorithms on processor module 202. Processor module 204 includes memory 216 which stores one or more fault detection algorithms as executable instructions that is executed by processor 214. Also, memory 216 can store fault patterns that can be matched to resulting scatter patterns received over fiber network 206 in order to correlate to condition indicators. In embodiments, the instructions may be stored or organized in any manner and at any level of abstraction, such as in connection with the execution of the fault detection algorithms. Processor 214 may be any type of processor (CPU), including a general purpose processor, a digital signal processor, a microcontroller, an application specific integrated circuit, a field programmable gate array or the like. Also, in embodiments, memory 216 may include random access memory (RAM), read only memory (ROM), or other electronic, optical, magnetic or any other computer readable medium onto which is stored the fault detection algorithms.

Processor module 202 can implement a fault detection algorithm in order to determine discontinuities or breaks in fiber network 206. In an embodiment, the fault detection algorithms on processor module 202 provide instructions for fault isolation and detection of faults over fiber network 206. The fault detection algorithm commands OTDR transceiver 211 to transmit a very-short duration, high-power, laser pulse over one or more fiber cables that define fiber network 206 and, thereafter, observe the returned reflections from the pulse. By comparing the observed time domain reflections response to the time domain response that would be expected for a non-damaged or intact fiber cable, a discontinuity in a fiber cable can be detected. Additionally, the time delay between the emission of the laser pulse and the detection of its partial reflection back from the damaged portion of the cable can be used to determine how far such light traveled and, hence, localizes the fault in the fiber cable by determining the distance to the damaged portion. Architecture 200 provides location information of a fault in the fiber cable within the fiber network 206. This provides advantages over conventional methods of fault detection, where lack of detection of a fault at a specific fiber cable or at a specific location requires that an entire harness having multiple fiber cables be replaced. While the fault detection algorithm is described with reference to processor module 202, in embodiments, fault detection algorithm may be implemented on processor module 204 or any other processor module in lieu of or in addition to that implemented on processor module 202.

Processor modules 202 and 204 and others and data bus 218 constitute a networked, distributed architecture. In an embodiment, other sensors, such as vibration sensors, thermocouples, barometers, or other types of sensors may be attached to the processing modules, while the processors are also applied to execute algorithms on the sensor data. The processing module memories 212 and 216, may store this algorithm code, configuration, and output. The processing modules may also serve as dynamic routers. Given a failure of some leg of the network, data may be dynamically routed via some other extent path to the desired endpoint.

In embodiments, processor module 202 can implement a fault detection algorithm for determining link-loss between processor modules 202 and 204 including determining BIT error rates over fiber network 206. Processor module 202 can command OTDR transceiver 211 to transmit pulses (or bit blasts) over fiber network 206 and observe the received data at processor module 204. Processor module 202 can calculate link-loss as a CI. Also, data stored in processor module 202 may be provided to IVHMU 208 for pre- or post-flight diagnostics such as, for example, to correlate received signal power with other devices and to correlate with fiber end face inspection. During normal operations, processor module 202 may communicate with processor module 204 by transmitting data over fiber network 206. In a post-test mode, when no data is sensed on the fiber network 206, processor module 202 may be commanded to determine degradation of fiber network 206 whereby OTDR transceiver 211 pulses fiber network 206 with pulses and observes the time-resulting scatter patterns in processor module 204. These scatter patterns can be matched to stored fault patterns stored in memory 212 which correlate to CIs. Each CI is evidence of a fault attribute for fiber network 206. In embodiments, IVHMU 208 may store a count of faults detected by fault monitoring system 120 and prioritize the faults for further action by maintenance crews.

Figure 3:
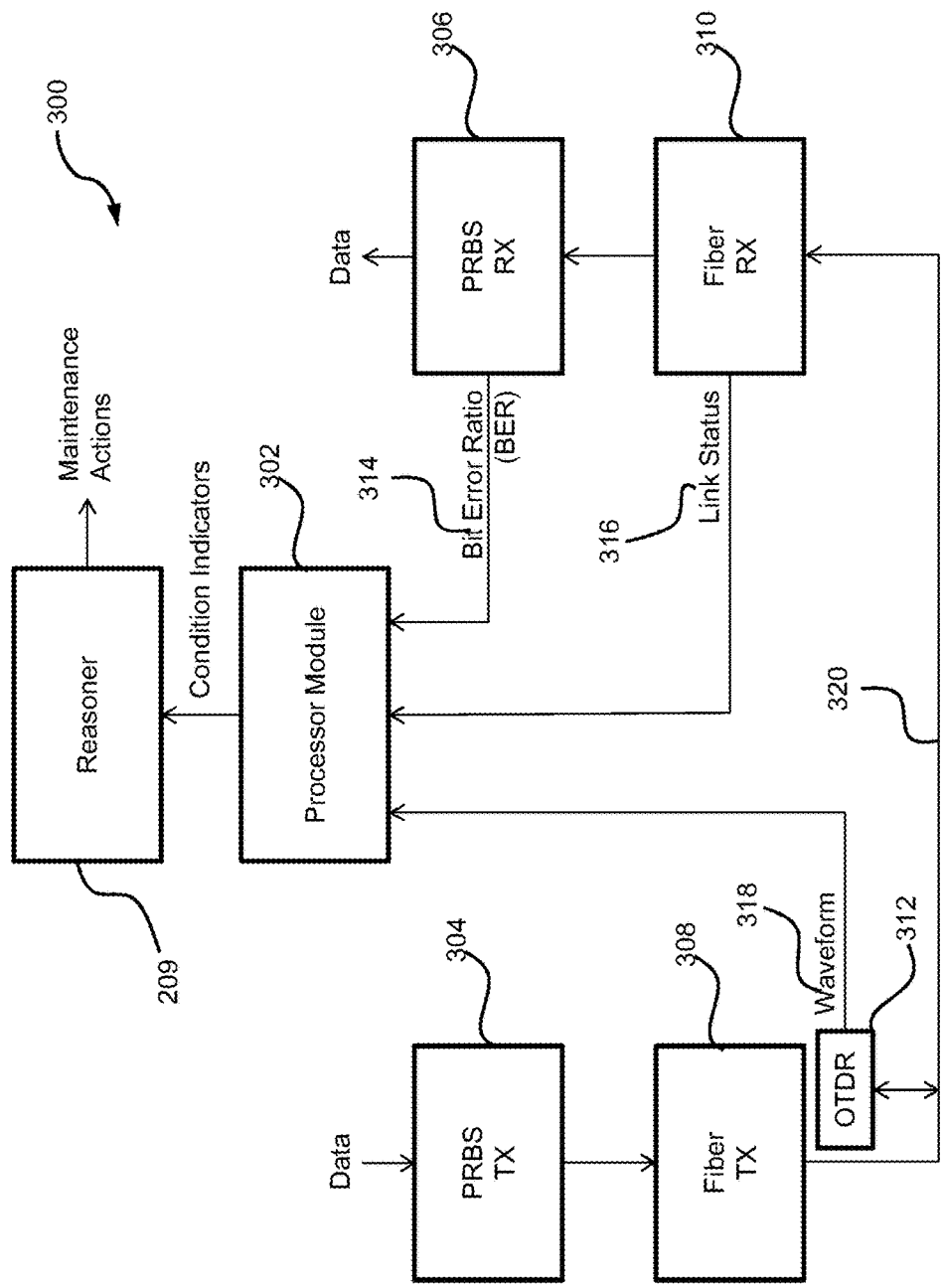
FIG. 3 is an architecture illustrating use of a bit sequence to test quality of a fiber link according to an embodiment of the invention.

FIG. 3 illustrates exemplary application architecture 300 depicting one path of processor module 302 where data such as a pseudo-random bit sequence (PRBS) pattern may be utilized to test the quality of a fiber link 320 in fiber network 206 (FIG. 2). Processor module 302 is substantially similar to processor modules 202 and 204 and architecture 300 can include fiber transmitter 308 and fiber receiver 310 in communication with OTDR transceiver 312 and a PRBS transceiver having a PRBS transmitter 304 and PRBS receiver 306 in order to interrogate fiber network 206 (FIG. 2). With this method, a PRBS can be generated by PRBS transmitter 304 and transmitted through fiber transmitter 308 at one end of fiber link 320. The PRBS sequence is received by PRBS receiver 306 through fiber receiver 310 at another end of fiber link 320. The receiving end of fiber link 320 synchronizes to the PRBS pattern. Bit errors that are introduced by degradation in fiber link 320 can be detected and quantified at PRBS receiver 306. The bit error ratio 314 (BER) may be computed as the number of bit errors divided by the total number of bits that have been received. The BER 314 can be used to quantify the quality of fiber link 320, as well as measure the severity of degradation in fiber link 320. The BER 314 can be fed to processor module 302 and utilized to generate condition indicators defining a condition indication of fiber link 320. Vehicle reasoner engine 209 can store condition indicators for determination of further actions by maintenance crews based on the received condition indicators. In embodiments, the PRBS sequence can be transmitted and received at a same node (e.g., processor module 202) or alternatively, can be received at another processor module 204 that represents another node in fiber network 206.

The BER or similar methods can be utilized at different points during operation of the system. The BER method may be employed at startup as part of a built-in test (BIT). The quality of a fiber link can be quantified prior to sending data over the link. Additionally, the BER method may be utilized at scheduled time intervals during operation. If the link is not currently in use, then the BER 314 may be measured. The fiber receiver 310 may provide a binary output indicating the link status 316 of the optical link. Information for link status 316 can be fed to processor module 302 and utilized to generate condition indicators. The processor module 302 may process information from an OTDR waveform 318 received from an OTDR module 312, link status 316 and BER 314 in order to compute condition indicators on the link. This information can be fed to the system in order to reduce the impact of degradation or failures in the system.

Figure 4:
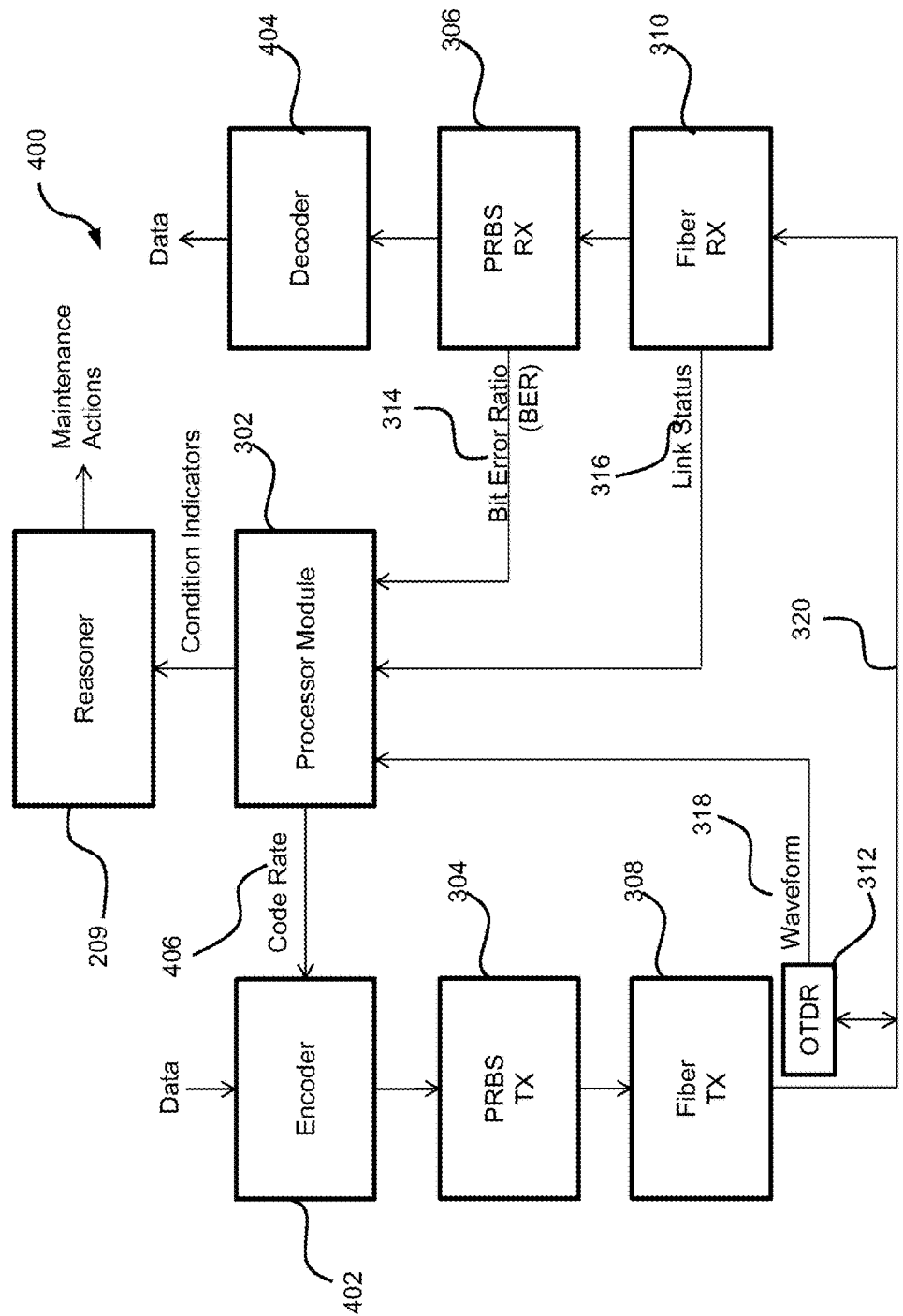
FIG. 4 is an architecture illustrating use of adaptive coding to test quality of a fiber link according to an embodiment of the invention.

FIG. 4 illustrates an embodiment of an exemplary architecture 400, where the system may utilize adaptive coding through encoder 402 and decoder 404 so as to improve the link quality and minimize the probability of error. Architecture 400 is substantially similar to architecture 300 shown and described in FIG. 3; however, architecture 400 utilizes a feedback loop through encoder 402 that assigns a parity bit on data transmitted through link 320 that can help to detect bit errors that were introduced in the link 320. If the link 320 is degraded, processor module 302 may compute a code rate 406 that can be utilized to improve the performance of fiber link 320. Code rate 406 is a coded signal that is composed of data and parity bits. The code rate 406 is a ratio of data bits to total bits, where total bits is the sum of data and parity bits. The probability of error can be reduced by increasing the quantity of parity bits. This reduces the data throughput of the link 320, while increasing the quality of the link 320. The system may adaptively alter the code rate 406 when link degradation is detected in order to ensure a high quality link 320.

Figure 5:
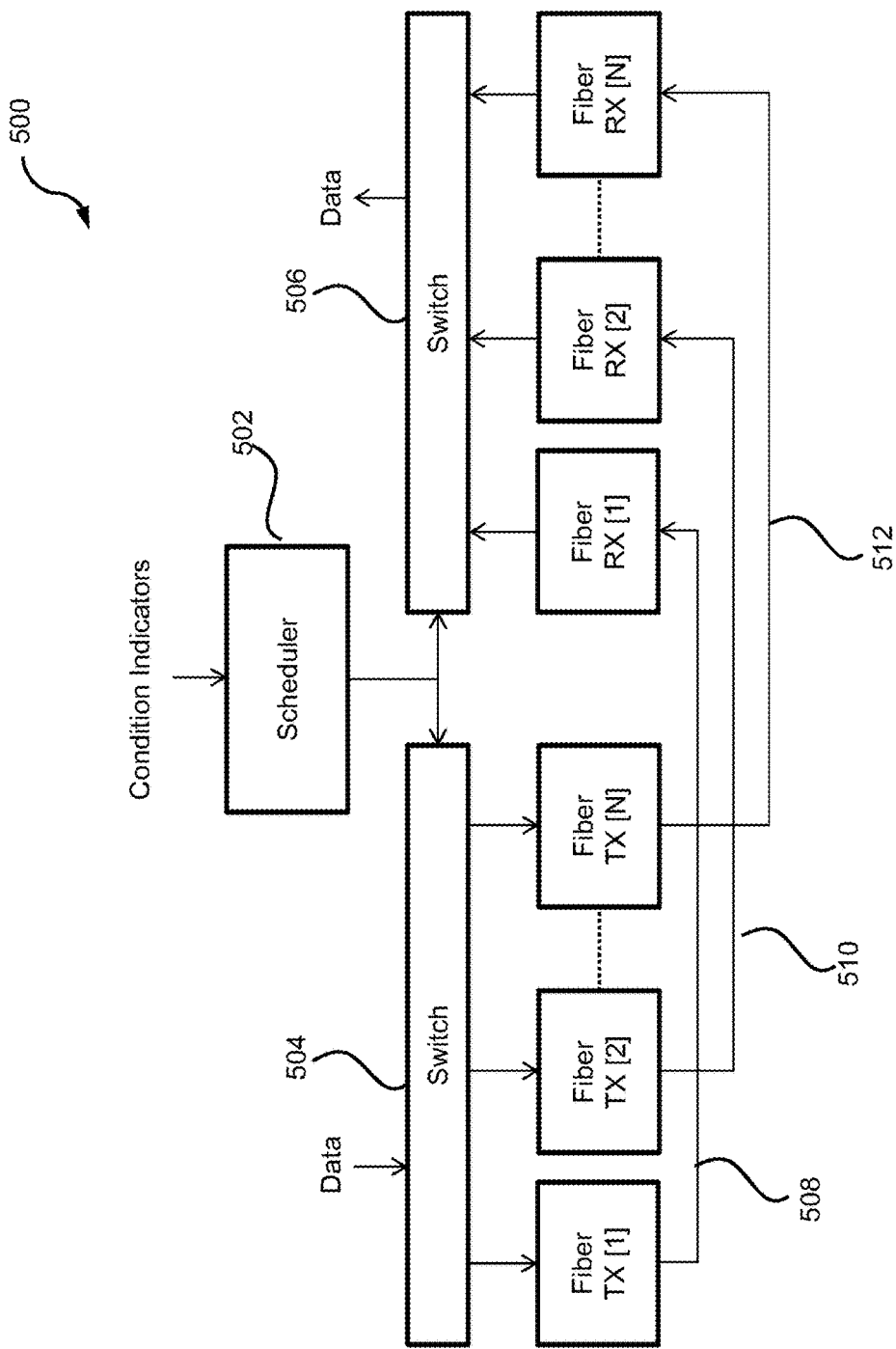
FIG. 5 is an architecture illustrating use of a parallel fiber system for data transfer according to an embodiment of the invention.
Figure 6:
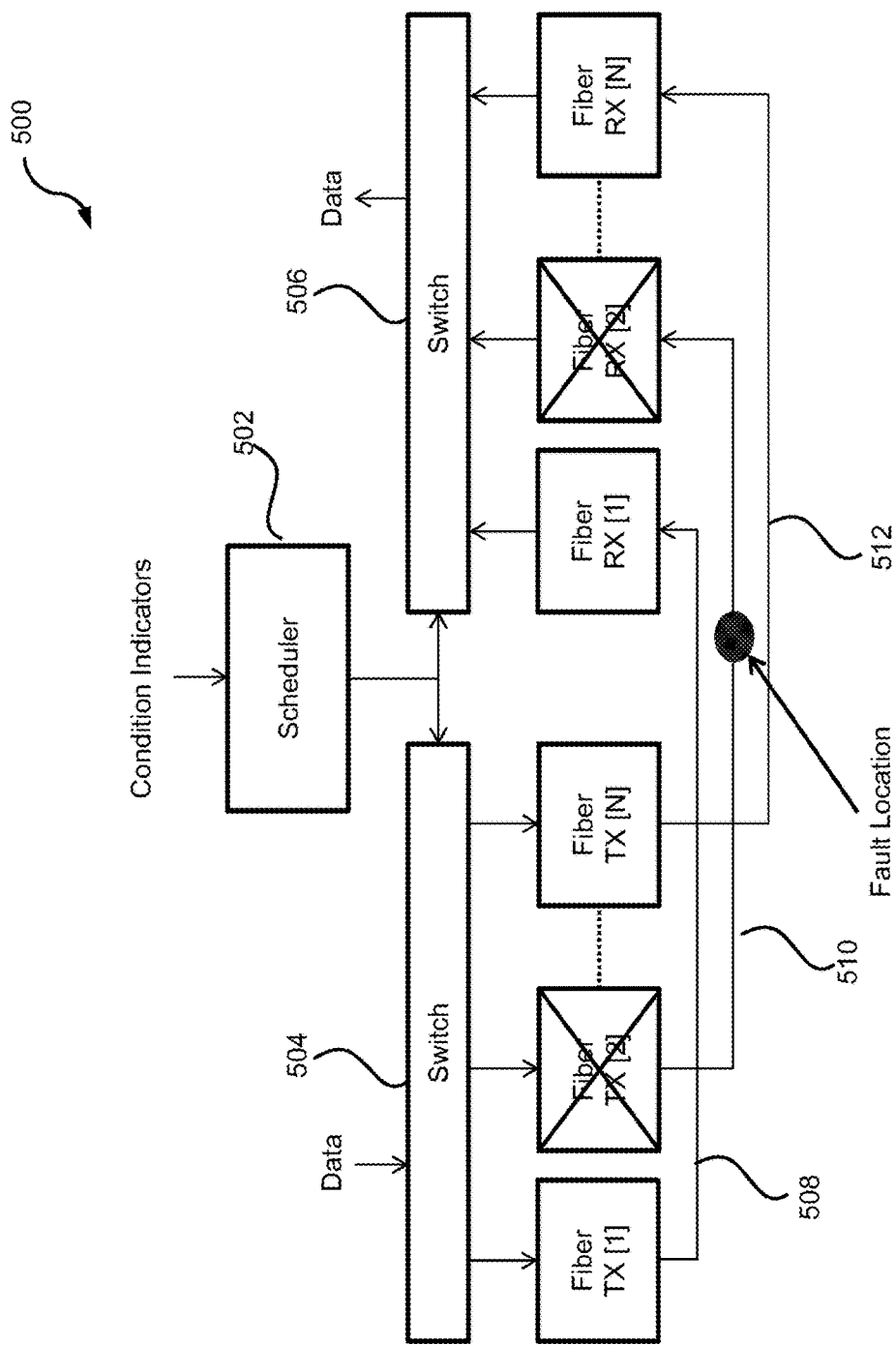
FIG. 6 is an architecture illustrating use of fiber system of FIG. 5 but shown with self-healing of a fiber system according to an embodiment of the invention.

FIGS. 5 and 6 illustrate an exemplary architecture 500, where a parallel fiber system is composed of multiple fiber links 508-512 for transmitting data through fiber network 206 (FIG. 2). Each fiber link in the plurality of fiber links 508-512 is associated with a pair of fiber transceivers comprising a fiber transmitter and fiber receiver. Architecture 500 can be used to overcome network faults in one or more fiber links 508-512 through self-healing. As illustrated, fiber network 206 (FIG. 2) includes fiber links 508-512, with data link 510 being used as an example of a faulty fiber link. The architecture 500 utilizes a scheduler 502 in communication with processor module 302 (FIGS. 3-4) and switches 505 and 506. In an example, scheduler 502 can select a particular fiber link to use for transmitting data. In cases where more data is available than what a fiber link can handle, the scheduler 502 schedules data transmission through other available fiber links 508-512 through time-division multiplexing (TDM). Using the techniques discussed in FIGS. 3-4, processor module 302 may detect a degraded or faulty fiber link 510 through determination of link status 316 and BER 314 as discussed in FIGS. 3-4. Processor module 302 may autonomously notify scheduler 502 to remove fiber link 510 (FIG. 6) from use, thus preventing data from being transmitted over a faulty link 510.

Figure 7:
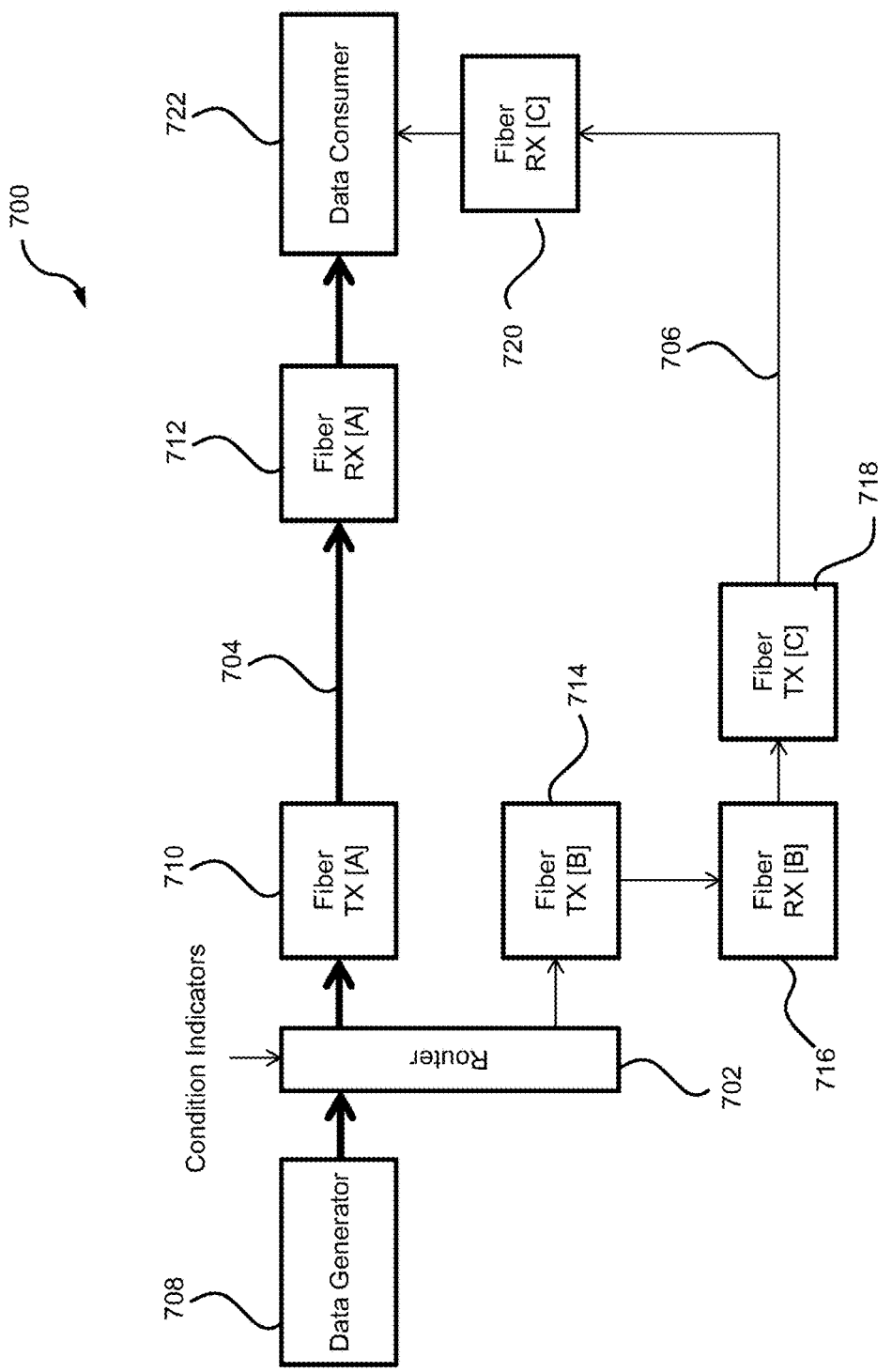
FIG. 7 is an architecture illustrating use of a parallel network for data transfer according to an embodiment of the invention.
Figure 8:
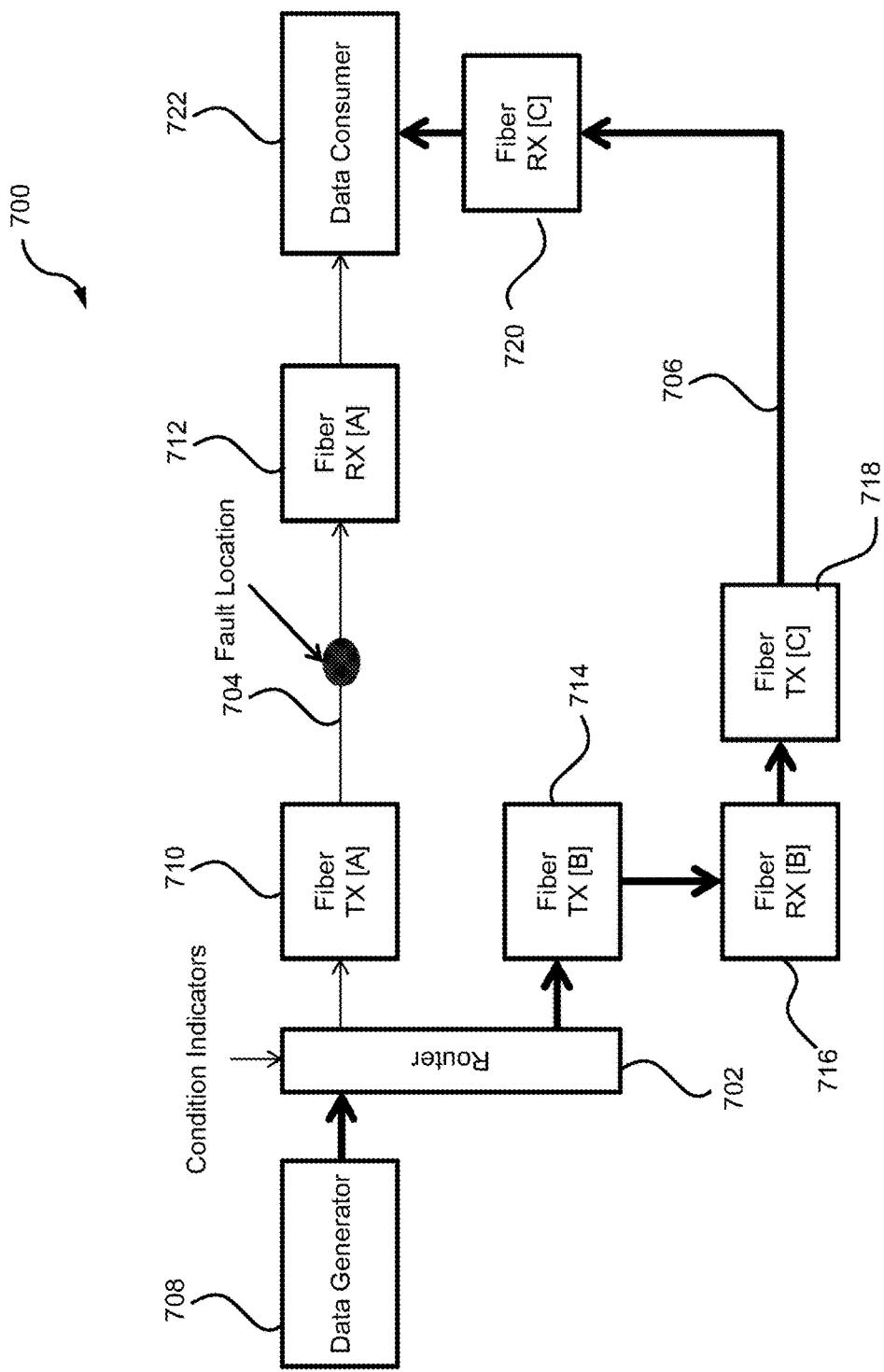
FIG. 8 is an architecture illustrating use of network of FIG. 7 but shown with self-healing of a fiber network according to an embodiment of the invention.

FIGS. 7 and 8 illustrate an exemplary architecture 700 depicting a networked fiber system where multiple paths can be utilized to transfer data within fiber network 206 (FIG. 2). Therefore, the system may utilize one path for normal operation, but be able to handle a failure by switching to an alternate data path as shown in FIG. 8. Architecture 700 can be used to overcome network faults in a fiber network through self-healing. Under normal operation, data is transmitted from data generator 708 through fiber link 704 via fiber transmitter 710 and fiber receiver 712. A router 702 performs the function of routing data through one or more fiber links and transceivers from a data generator 708 to a data consumer 722 upon determination that a particular link is faulty such as, for example, fiber link 704 in FIG. 8. Using the techniques discussed in FIGS. 3-4, processor module 302 may detect a degraded or faulty fiber link 704 (FIG. 8) through determination of link status 316 and BER 314. Processor module 302 may provide this information to router 702, which can alter the flow of data from the faulty fiber link 704 to a healthy fiber link 706 via fiber transmitters 714 and 718 and fiber receivers 716 and 720. This ensures that any interruption in the data flow is limited and temporary.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. For instance, aspects of the invention are not limited to rotorcraft, and can be used in fiber networks in fixed structures and other mobile vehicles such as fixed wing vehicles, land vehicles and sea-based vehicles. Many modifications, variations, alterations, substitutions or equivalent arrangements not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of condition based maintenance of a fiber network, comprising:
   transmitting, with a processor, an optical signal over a plurality of fiber links in the fiber network;
   receiving, with the processor, a response signal in response to the transmitting of the optical signal;

determining, with the processor, one or more condition indicators of the plurality of fiber links in response to the receiving of the response signal, wherein the one or more condition indicators are evidence of a fault of the plurality of fiber links; and prioritizing and storing the one or more condition indicators for further action by maintenance personnel.

2. The method of claim 1, further comprising transmitting a pseudo-random bit sequence (PRBS) in the optical signal.

3. The method of claim 2, further comprising transmitting parity bits in the PRBS.

4. The method of claim 1, further comprising determining a bit error ratio in the response signal.

5. The method of claim 4, further comprising determining a faulty fiber link of the plurality of fiber links in response to the determining of the bit error ratio.

6. The method of claim 5, further comprising routing the optical signal away from the faulty fiber link in response to the determining of the bit error ratio.

7. The method of claim 1, wherein the response signal comprises a reflected signal indicative of a discontinuity in the fiber network.

8. The method of claim 1, wherein the response signal is indicative of a link loss in transmission over the fiber network.

9. The method of claim 1, further comprising comparing the response signal with a stored fault pattern in response to the receiving of the response signal.

10. The method of claim 1, further comprising transmitting the one or more condition indicators to a reasoner engine, the reasoner engine performing the prioritizing and ranking the one or more condition indicators.

11. A system for condition based maintenance of a fiber network, comprising:
    a processor; and
    memory having instructions stored thereon that, when executed by the processor, cause the system to:
        transmit an optical signal over a plurality of fiber links in the fiber network;
        receive a response signal in response to the transmitting of the optical signal; and
        determine one or more condition indicators of the plurality of fiber links in response to the receiving of the response signal, wherein the one or more condition indicators are evidence of a fault of the plurality of fiber links; and
        prioritize and store the one or more condition indicators for further action by maintenance personnel.

12. The system of claim 11, wherein the processor is configured to transmit a pseudo-random bit sequence (PRBS) in the optical signal via an optical time domain reflectometer (OTDR).

13. The system of claim 12, wherein the processor is configured to transmit parity bits in the PRBS.

14. The system of claim 11, wherein the processor is configured to determine a bit error ratio in the response signal.

15. The system of claim 14, wherein the processor is configured to determine a faulty fiber link of the plurality of fiber links in response to the determining of the bit error ratio.

16. The system of claim 15, wherein the processor is configured to route the optical signal away from the faulty fiber link in response to the determining of the bit error ratio.

17. The system of claim 11, wherein the response signal comprises a reflected signal indicative of a discontinuity in the fiber network.

18. The system of claim 11, wherein the processor is configured to compare the response signal with a stored fault pattern in response to the receiving of the response signal.

19. The system of claim 11, wherein the processor is configured to transmit the one or more condition indicators to a reasoner engine, and the reasoner engine is operable to prioritize and store the one or more condition indicators.

20. The system of claim 11, wherein the condition indicator is indicative of a faulty link in transmission over the fiber network.

* * * * *